(12) United States Patent
Zhang et al.

(10) Patent No.: US 7,526,518 B2
(45) Date of Patent: Apr. 28, 2009

(54) GALOIS FIELD MULTIPLICATION SYSTEM AND METHOD

(75) Inventors: Ming Zhang, San Jose, CA (US); Awais Bin Nemat, Santa Clara, CA (US); David Edward Bliss, Loomis, CA (US)

(73) Assignee: Cisco Technology, Inc., San Jose, CA (US)

( * ) Notice: Subject to any disclaimer, the term of this patent is extended or adjusted under 35 U.S.C. 154(b) by 771 days.

(21) Appl. No.: 10/964,850

(22) Filed: Oct. 13, 2004

(65) Prior Publication Data

US 2006/0080376 A1    Apr. 13, 2006

(51) Int. Cl.
*G06F 7/00*    (2006.01)
(52) U.S. Cl. ...................................... 708/492
(58) Field of Classification Search ................. 708/492; 380/28
See application file for complete search history.

(56) References Cited

U.S. PATENT DOCUMENTS

| | | | | |
|---|---|---|---|---|
| 5,787,028 | A * | 7/1998 | Mullin | 708/492 |
| 6,199,088 | B1 | 3/2001 | Weng et al. | 708/492 |
| 6,470,371 | B1 | 10/2002 | Park | 708/626 |
| 6,760,742 | B1 | 7/2004 | Hoyle | 708/492 |
| 6,779,011 | B2 | 8/2004 | Weng et al. | 708/492 |
| 2005/0149832 | A1* | 7/2005 | Liberol et al. | 714/781 |
| 2006/0020654 | A1* | 1/2006 | Hubert | 708/492 |

OTHER PUBLICATIONS www.ka9q.net, Phil Karn, "Introduction and Executive Summary," 8 pages total, Jan. 7, 2002, www.ka9q.net/papers/ao40tlm.html.
www.portal.acm.org, Christof Paar, Peter Fleischmann, Pedro Soria-Rodriguez; "Fast Arithmetic for Public-Key Algorithms in Galois Fields with Composite Exponents," 5 pages total, Oct. 1999, ACM Inc., portal.acm.org/affiliated/citation.cfm?id=323224&dl=guide &cull=acm&cfid=15151515&cftoken=6184618.
C. Grabbe et al., "FPGA Designs of Parallel High Performance GF (2 to the 233) Multipliers", Proceedings of the IEEE International Symposium on Circuits and Systems, vol. II, pp. 268-271, 2003.
A. Halbutoğullari et al., "Mastrovito Multiplier for General Irreducible Polynomials", Oregon State University, 10 pages, 2000.

(Continued)

*Primary Examiner*—Chuong D Ngo
(74) *Attorney, Agent, or Firm*—Stolowitz Ford Cowger LLP

(57) ABSTRACT

A present invention Galois field multiplier system and method utilize lookup tables to generate one partial product term and one feedback term in one clock cycle. In one embodiment, a Galois field multiplier system includes a plurality of shift registers, a plurality of exclusive OR components, a partial product lookup table, and a feedback table lookup table. The plurality of shift registers perform shift multiplication operation and are coupled to the plurality of shift registers that perform addition operations. The partial product lookup table and feedback lookup tables are selectively coupled to the exclusive OR components and values from the partial product lookup table and feedback lookup tables are fed into the selectively coupled exclusive OR components. Coefficients of the partial product term and feedback term are utilized as indexes to the partial product lookup table and feedback lookup table respectively.

23 Claims, 5 Drawing Sheets

OTHER PUBLICATIONS

Yongfei Hang et al., "Fast Algorithms for Elliptic Curve Cryptosystems over Binary Finite Field", Proceedings of the International Conference on the Theory and Applications of Cryptology and Information Security: Advances in Cryptology, pp. 75-85, Springer-Verlag, 1999.

Berk Sunar, "Fast Galois Field Arithmetic of Elliptic Curve Cryptography and Error Control Codes", Oregon State University, 81 pages, 1998.

Tong Zhang et al., "Systematic Design Approach of Mastrovito Multipliers over GF (2 to the m)", Proceedings of the 2000 IEEE Workshop on Signal Processing Systems, pp. 507-516, 2000.

* cited by examiner

GALOIS FIELD MULTIPLICATION SYSTEM AND METHOD

FIELD OF THE INVENTION

This invention relates to the field of computational systems. In particular, the present invention relates to a Galois field multiplication system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. These results are often provided by systems that perform complicated computational operations, including operations associated with coding and cryptography techniques utilizing Galois fields. Many coding and cryptography applications require the operations to be completed quickly and slow results can have adverse impacts on performance. However, traditional Galois field computation approaches often involve a relatively significant amount of resources and/or a large number of computation iterations that require a relatively long time to complete.

As various information processing systems advance and proliferate, reliable and efficient information communication and/or storage systems are becoming more important and often critical. Emerging large-scale and/or fast systems (e.g., storage devices, data networks, etc.) often require effective and dependable handling of vast amounts of information. Traditional systems often utilize Galois field multiplication and division to facilitate accurate and dependable exchange, processing and retention of information in a variety of applications. For example, Galois field computations are often used to ensure information is secure and/or an accurately reproduced.

Reliably "reproducing" data without errors (e.g., introduced by a signal "corrupted" during communication) is one typical major concern in both the communication and storage of information. Error detection and correction schemes typically involve encoding/decoding information "messages". For example, a message is typically divided into blocks of k information bits each with a total of $2^k$ different possible messages. An encoder transforms each message into an n-tuple vector of discrete symbols called a code word or code vector. Code words and/or encrypted messages are often encoded and decoded utilizing Galois field manipulation. For example, codewords of cyclic codes are conveniently represented as Galois field polynomials that are encoded and decoded using multiplication and division of the Galois field representation.

Galois field multiplication and division can also be utilized in cryptography operations by encoding messages to permit secure communication over an otherwise insecure communication channel. Cryptography systems usually involve manipulations of a message in accordance with a "key" and encryption/decryption rules. Traditionally, keys are utilized in both symmetric cryptographic system (e.g., based on a secret "key") and asymmetric cryptographic systems (e.g., based upon a public-private key pair). The underlying operations involved in these cryptography systems often involve Galois field multiplication and division of the messages and keys to encrypt/decrypt cyphertext.

Traditional Galois field $GF(2^m)$ multiplication and division approaches often utilize single bitwise serial or parallel operations. Traditional parallel $GF(2^m)$ multipliers typically generate n partial products and n feedback terms each n bits wide. Then an exclusive OR (XOR) of the n partial products and n feedback terms is performed to get a single final product. Bit parallel multipliers generally provide results in one clock cycle (output bits are calculated in one clock cycle) and involve significant hardware (e.g., silicon area) requirements. The significant hardware requirements of bit parallel multipliers often make them impractical for a number of large degree applications (e.g., a $2^{128}$ multiplier for authentication in CPS GCM mode). Serial bit multipliers typically require less hardware and are usually well suited for normal basis representation allowing efficient expontentiation.

While serial bit multipliers typically require less hardware, serial bit multipliers usually require multiple clock cycles to provide a final output. In conventional $GF(2^m)$ serial approaches, a single bit is usually entered for each iteration (e.g., one output bit is calculated per clock cycle). For example, in a typical traditional serial multiplier approach one bit of a multiplier generates one partial product. Since the inputs (e.g., multiplier, quotient, etc) usually have a rather large number of bits, conventional approaches produce a relatively large number of partial products that require a significant number of XOR iterations, which can take a relatively significant amount of time to complete (e.g., due to large iteration delays).

SUMMARY

A Galois field multiplier system and method for reducing exclusive OR iterations in Galois field multiplication are presented. A present invention Galois field multiplier system and method utilize lookup tables to facilitate simplified and expedited Galois field multiplication. The lookup tables permit the use of multiple bits of a multiplier to generate one partial product term and one feedback term in one clock cycle. In one embodiment, a Galois field multiplier system includes a plurality of shift registers, a plurality of exclusive OR components, a partial product lookup table, and a feedback table lookup table. The plurality of shift registers perform shift multiplication operations. The plurality of exclusive OR components are coupled to the plurality of shift registers and perform addition operations. The partial product lookup table is selectively coupled to the exclusive OR components and values from the partial product lookup table are fed into the selectively coupled exclusive OR components. Similarly, the feedback table lookup table is selectively coupled to the exclusive OR components and values from the feedback lookup table are fed into the selectively coupled exclusive OR components. The coefficients of the partial product term and feedback term are utilized as indexes to the partial product lookup table and feedback lookup table respectively.

DETAILED DESCRIPTION

Figure 1:
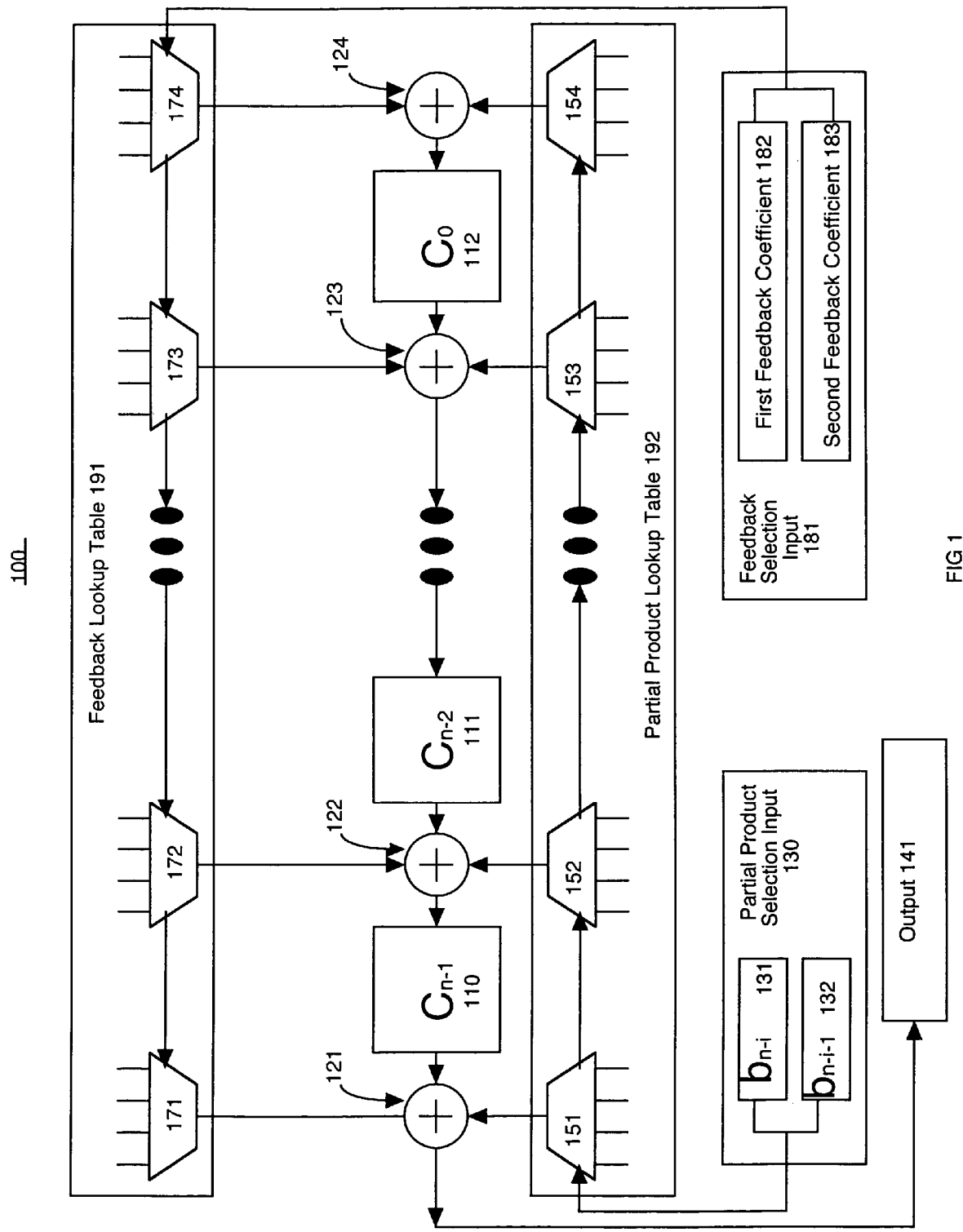
FIG. 1 is a block diagram of a Galois field multiplier system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

In one embodiment, a present invention Galois field multiplier system and method utilizes multiple coefficient bits of a partial product term and feedback term as indexes to a partial product term lookup table and a feedback term lookup table respectively. The partial product term lookup table and the feedback term lookup table return partial product values and feedback values for use in Galois field multiplication operations. The lookup tables permit the use of multiple bits of a multiplier to generate one partial product term and one feedback term in one clock cycle.

In one exemplary implementation, a Galois Field $GF(2^n)$ multiplier in standard basis is used in which:

$$A = \sum_{i=0}^{n-1} a_i \alpha^i, \ B = \sum_{i=0}^{n-1} b_i \alpha^i, \ f(x) = x^n + \sum_{i=0}^{n-1} g_i x^i, \ g(x) = \sum_{i=0}^{n-1} g_i x^i$$

$$\text{for } C = \sum_{i=0}^{n-1} C_i \alpha^i$$

where C is the product of A and B. For example, the operation for C can be written as follows:

$$C = AB \bmod f(x)$$
$$= (Ab_0 \bmod f(x)) + (Ab_1 \alpha \bmod f(x)) + (Ab_2 \alpha^2 \bmod f(x)) + \ldots + (Ab_{n-1} \alpha^{n-1} \bmod f(x))$$
$$= b_0 A + b_1 (A \alpha \bmod f(x)) + b_2 (A \alpha^2 \bmod f(x)) + \ldots + b_{n-1} (A \alpha^{n-1} \bmod f(x))$$

in a least significant bit (LSB) first implementation. Alternatively, the equation for C can be written as:

$$C = AB \bmod f(x)$$

-continued
$$= (\ldots(Ab_{n-1}\alpha + Ab_{n-2})\alpha + + Ab_1)\alpha + Ab_0 \bmod f(x)$$

in a most significant bit (MSB) first implementation. Using a MSB first example, for step or iteration "k", where k is greater than zero and less than n+1 (e.g., 0<k<n+1) then:

$$C(k) = C(k-1)\alpha + A \ b_{n-k} \bmod f(x)$$

for each C(k).

In one embodiment, the operations for determining C(k) include shift operations (e.g., a left shift by one), feedback operations and partial product operations. When C(k), A and g are treated as n-element arrays and using the definition:

$$A[n-1:0] \ \alpha \bmod f(x) = \{A[n-2:0], 1'b0\} + (A[n-1] \ g)$$

the operations for determining C(k) can be expressed as:

$$C(k) = \{C(k-1)[n-2:0], 1'b0\} + (C(k-1)[n-1]g) + Ab_{n-k}$$
$$= \{C(k-1)[n-2:0], 1'b0\} + FB(k) + PP(n-k)$$

where PP (n–k) is a partial product term and FB(k) is a feedback term.

In one embodiment, more than one bit is utilized to generate one partial product term for PP(n–k) and the total number partial products that would otherwise be performed is reduced, which in turn reduces the number of partial product XOR iterations that would otherwise be performed. Similarly, more than one bit can be utilized to generate one feedback term for FB(k). Again, the total number of feedback XOR iterations that would otherwise be performed can be reduced. Multiple bits of the partial product PP(n–k) coefficient are utilized to generate one partial product term and multiple bits of the feedback FB(k) coefficient are utilized to generate one feedback term.

In one exemplary implementation, two bits are utilized to generate one partial product term PP(n–k) and one feed back term FB(k). The operations for performing a Galois field multiplication using two bits to generate the partial product term PP(n–k) and one feedback term FB(k) can be expressed as:

$$C(k+1) = C(k+1)[n-1:0] = \{C(k)[n-2:0], 1'b0\} + (C(k)[n-1]g) + Ab_{n-k-1}$$
$$= \{\{C(k-1)[n-3:0], 1'b0\} + (C(k-1)[n-1]g[n-2:0]) + A[n-2:0]b_{n-k}\}, 1'b0\} + (C(k)[n-1]g) + Ab_{n-k-1}$$
$$= \{C(k-1)[n-3:0], 2'b00\} +$$

$$C(k-1)[n-1] \ \{g[n-2:0], 1'b0\} + C(k)[n-1] \ g + b_{n-k}\{A[n-2:0], 1'b0\} + b_{n-k-1}A$$

This can be rewritten as:

$$C(k+1) = \{C(k-1)[n-3:0], 2'b00\} + PP^*[n-k] + FB^*(k)$$

with partial product term PP*[n–k] and feedback term FB*(k). The partial product operations can be expressed as:

$$PP^*[n-k] = b_{n-k}\{A[n-2:0], 1'b0\} + b_{n-k-1}A$$

with partial product term PP*[n−k] and feedback term FB*(k). The feedback operations can be expressed as:

$$FB^*(k) = C(k-1)[n-1]\{g[n-2:0], 1'b0\} + C(k)[n-1]g$$
$$= C(k-1)[n-1]\{g[n-2:0], 1'b0\} + (C(k-1)[n-2] + C(k-1)[n-1]g[n-1] + A[n-1]b[n-k])g$$

wherein $C(k-1)[n-1]$ and $C(k-1)[n-2]+C(k-1)[n-1]g[n-1]+An-1]b[n-k]$ are coefficients of the feedback term. The coefficients of the partial product term and feedback term are utilized to generate one partial product term for PP(n−k) and one feed back for term FB(k).

In the present implementation, the partial product term is defined by two bits. The first partial product term PP(n−k) coefficient bit is defined as:

$$PP(n-k) \text{ first bit} = b_{n-k}$$

and the second partial product term PP(n−k) coefficient bit is defined as:

$$PP(n-k) \text{ second bit} = b_{n-k-1}$$

wherein the first and second partial product term bits are coefficients of the partial product term. The first feedback term FB(k) bit is defined as:

$$FB(k) \text{ first bit} = C(k-1)[n-1]$$

and the second partial product term PP(n−k) bit is defined as:

$$FB(k) \text{ bit} = (C(k-1)[n-2] + C(k-1)[n-1]g[n-1] + A[n-1]b[n-k])$$

wherein the first and second feedback term bits are coefficients of the feedback term.

FIG. 1 is a block diagram of Galois field multiplier system 100 in accordance with one embodiment of the present invention. Galois field multiplier system 100 includes shift registers 110 through 112, exclusive OR gates 121 through 124, feedback lookup table 191 and partial product lookup table 192. The XOR gates 121 through 124 are sequentially coupled to interleaved respective shift registers 110 through 112. The XOR gates 121 through 124 are also coupled to feedback lookup table 191 and partial product lookup table 192. Feedback lookup table 191 is coupled to feedback selection input 181. Partial product lookup table 192 is coupled to partial product selection input 130. The XOR gate 121 forwards output 141.

The components of Galois field multiplier system 100 cooperatively operate to perform Galois field multiplication operations. Shift registers 110 through 112 perform shift "multiplication" operations. Exclusive OR components 121 through 124 perform logical exclusive OR "addition" operations. Partial product lookup table 192 forwards partial product values into the selectively coupled exclusive OR components 121 through 124 in accordance with information from partial product selection input 130. Feedback lookup table 191 forwards feedback values into the selectively coupled exclusive OR components 121 through 124 in accordance with selection information from feedback selection input 181.

In one embodiment of the present invention, the coefficients of a partial product term are utilized as indexes to partial product lookup table 192 and coefficients of a feedback term are utilized as indexes to feedback lookup table 191. For example, a first partial product coefficient 131 (e.g., $b_{n-i}$) and a second partial product coefficient 132 ($b_{n-i-1}$) are utilized as indexes to partial product lookup table 192. First feedback coefficient 182 (e.g., C(k−1)[n−1]) and second feedback coefficient 183 (e.g., C(k−1)[n−2]+C(k−1)[n−1]g[n−1]+A[n−1]b[n−k]) are utilized as indexes to feedback lookup table 191.

In one embodiment, a value field of the partial product lookup table is the sum of partial products from non-zero partial product index bits and a value field of the feedback lookup table is the sum of feedback terms from non-zero feedback index bits. In one exemplary implementation, the index address of the feedback table is calculated by a look ahead method. It is appreciated that a present invention lookup tables can have a variety of configurations and implementations. In one embodiment of the present invention, lookup tables include multiplexers that forward an output based upon the coefficient bits of a Galois field polynomial term. For example, partial product lookup table component 192 includes partial product multiplexers 151 through 154 and feedback lookup table component 191 includes feedback multiplexers 171 through 174. Partial product multiplexers 151 through 154 and feedback multiplexers 171 through 174 are coupled to exclusive OR gates 121 through 123 respectively. Partial product multiplexers 151 through 154 are also coupled to partial product selection input 130. Feedback multiplexers 171 through 174 are coupled to feedback selection input 181. Partial product multiplexers 151 through 154 forward a partial product term value based upon partial product selection input 130. Feedback multiplexers 171 through 174 forward a feedback term value based upon feedback selection input 181.

Figure 2:
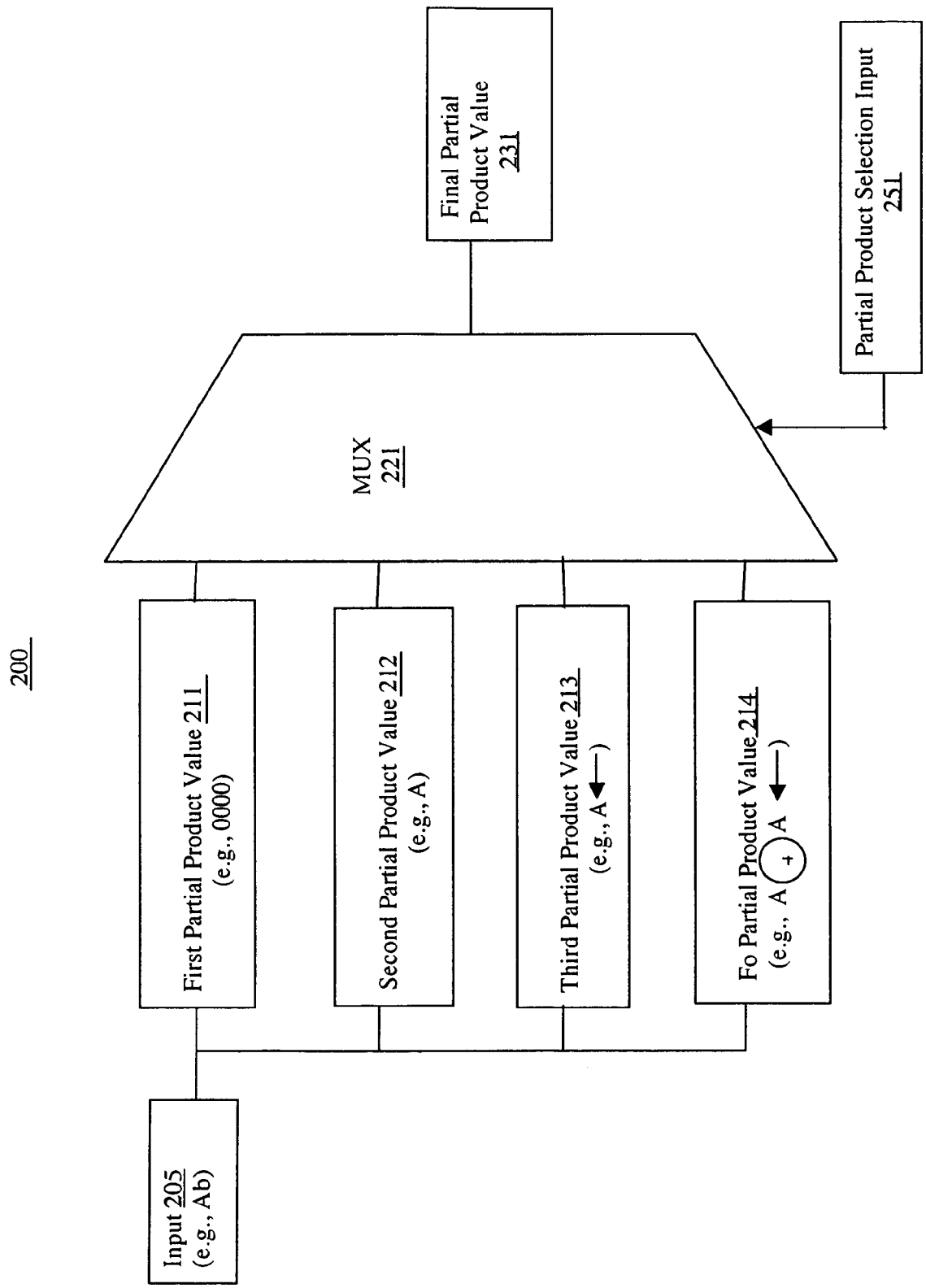
FIG. 2 is a block diagram of an exemplary partial product lookup table segment in accordance with one embodiment of the present invention.

In one embodiment of the present invention, partial product multiplexer configurations are dependent on the number of multiple bits that are utilized as coefficient inputs. FIG. 2 is a block diagram of an exemplary partial product lookup table segment 200 in accordance with one embodiment of the present invention. Partial product lookup table segment 200 includes partial product multiplexer 221 (e.g., similar to partial product multiplexers 151 through 154) coupled to inputs first partial product value 211, second partial product value 212, third partial product values 213, and for the partial product value 214. Partial product multiplexer 221 forwards one of the inputs as the final partial product value 231 based upon partial product selection input 251 (e.g., similar to partial product selection input 130). The partial product values can be calculated on the fly from input 205. For example, given input Ab, first partial product value 211 can be set to 0000, second partial product value 212 is set equal to A, and third partial product value 213 is set equal to A left shifted once. Forth partial product value 214 is set equal to A exclusive ORed with the value of A left shifted once.

Figure 3:
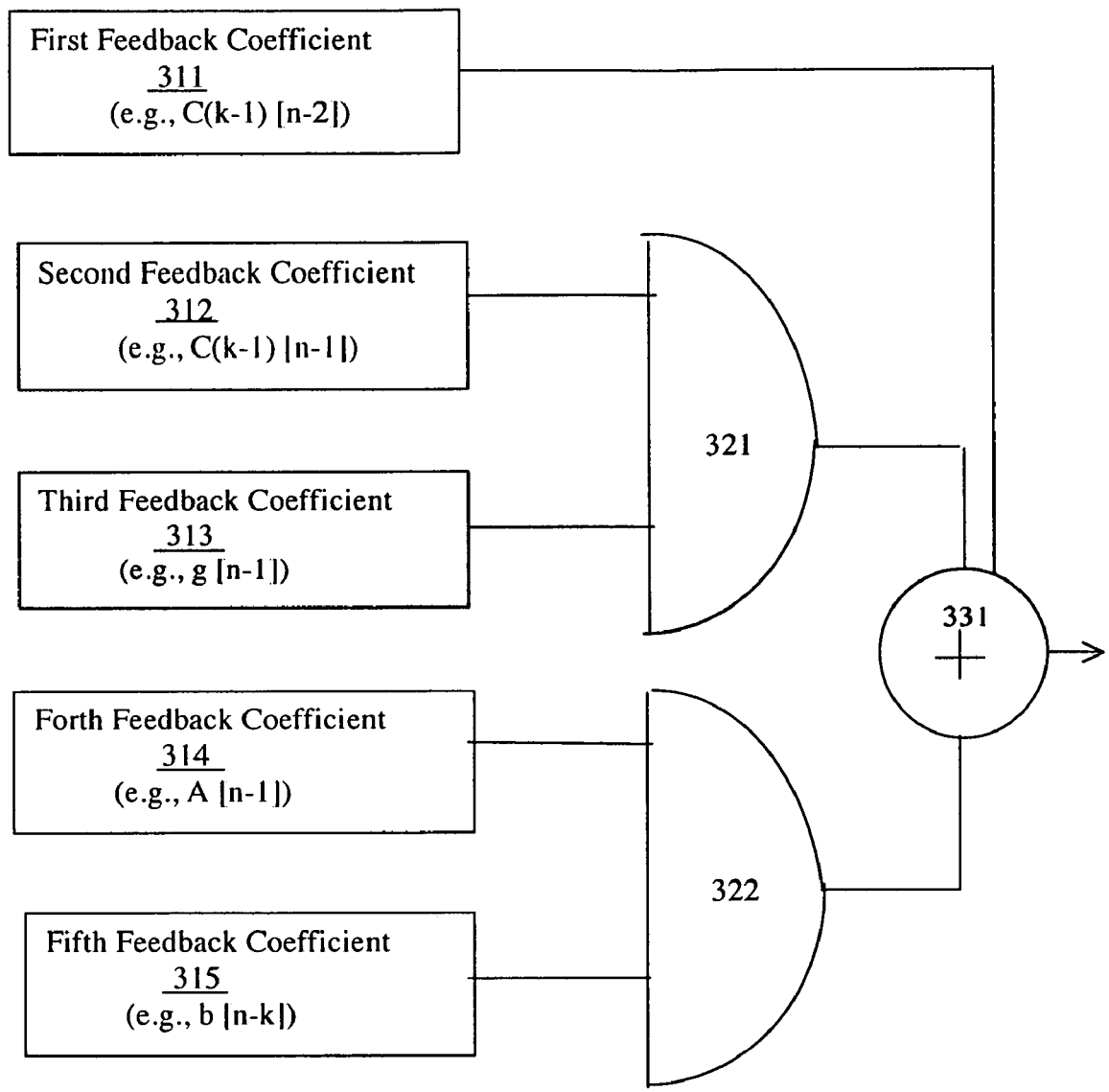
FIG. 3 is a block diagram of an exemplary feedback selection input component in accordance with one embodiment of the present invention.

FIG. 3 is a block diagram of an exemplary feedback coefficient determination component 300 in accordance with one embodiment of the present invention. In one exemplary implementation, feedback coefficient determination component 300 is utilized to determine (e.g., on the fly) a feedback coefficient for utilization as an index value to a feedback lookup table. Feedback coefficient determination component 300 includes a first logical AND gate 321 and a second logical AND gate 322 coupled to logical XOR gate 331. The first coefficient determination input 311 (e.g., C(k−1){n−2}), the outputs of first logical AND gate 321 and a second logical AND gate 322 are coupled to logical XOR gate 331. Second coefficient determination input (e.g., C(k−1[n−1]) and third coefficient determination input 312 (e.g. g[n−1]) are coupled to the input of first logical AND gate 321. Forth coefficient determination input 314 (e.g., A[n−1]) and fifth coefficient determination input 315 (e.g., b[n−k]) are coupled to the input of second logical AND gate 322.

Figure 4:
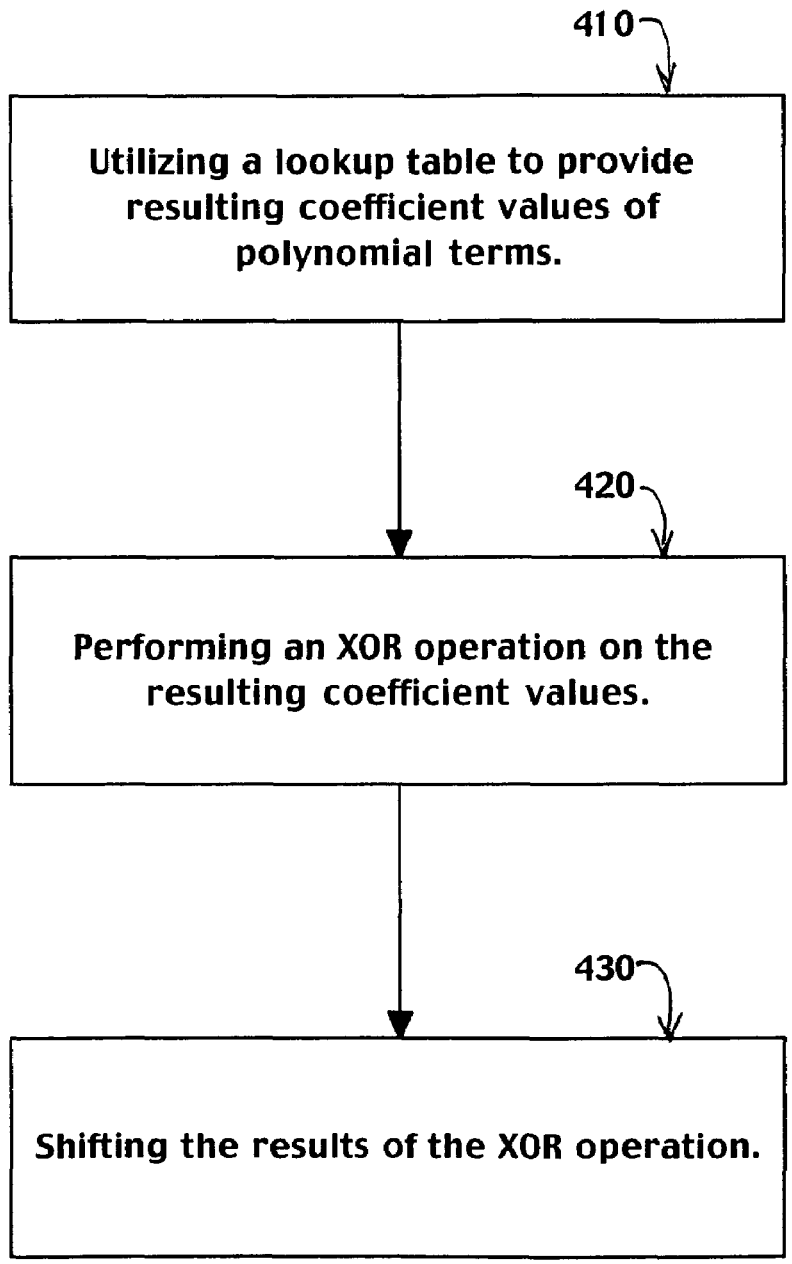
FIG. 4 is a flow chart of a Galois field multiplier method in accordance with one embodiment of the present invention.

FIG. 4 is a flow chart of Galois field multiplier method 400 in accordance with one embodiment of the present invention. Field multiplier method 400 facilitates reduction of XOR iterations in Galois field multiplication operations. Field multiplier method 400 can be utilized with irreducible polynomials operations that are fixed or programmable.

In step 410 a lookup table is utilized to provide resulting coefficient values of polynomial terms. In one embodiment, the resulting coefficient values are resulting partial product coefficient values and resulting feedback coefficient values. Multiple bits of a multiplier can be utilized as an index to the lookup table to generate one term (e.g., one partial product term, one feedback term, etc.). In one exemplary implementation the term is generated in one clock cycle.

In step 420, an exclusive OR operation is performed on the resulting coefficient values. In one embodiment of the present invention, the exclusive OR functions as a Galois field addition operation. By utilizing the coefficient values from the lookup table of step 410, less XOR operation iterations are performed than would otherwise be required.

In step 430, the results of the exclusive OR operation are shifted. In one exemplary implementation the XOR operation results are shifted to the left and the shifting functions as a Galois field multiplication.

The present invention can be implemented in a variety of systems (e.g., computers, data processing systems, communication networks) and/or diverse applications. For example, a present invention system and/or method can be implemented in a variety of storage devices (e.g., random access memories, hard drive memories, flash memories, etc.) and communication equipment (e.g., routers, switches, etc.). A present invention system and/or method can be utilized to perform Galois field multiplication and/or division associated with checking for errors in information (e.g. ECC encoding/decoding, etc.). A present invention system and/or method can also be utilized to facilitate security schemes and/or message authentication in a variety of applications. For example, communication of confidential information (e.g., information associated with financial transactions, national security, etc) over a network (e.g., over the Internet). It is appreciated that a present invention system and/or method can be implemented in a variety of cryptography and/or encoding implementations. For example, Galois field multiplier system 100 can be utilized to produce a codeword, a syndrome, cyphertext, etc. It is also appreciated that the present invention can be implemented in hardware, software, firmware and/or combinations thereof. For example, instructions for causing a processor to perform Galois field multiplier method 400 can be stored on a computer readable medium and executed by a processing system.

Figure 5:
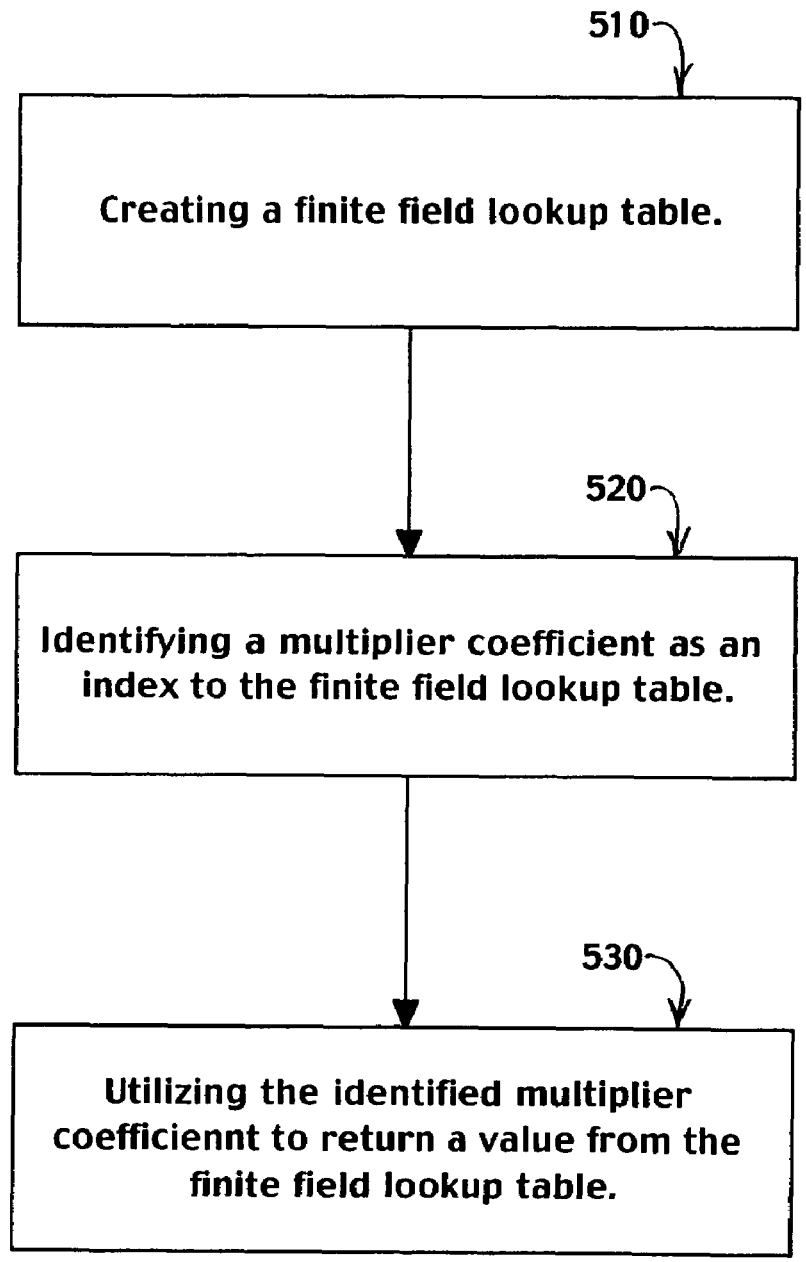
FIG. 5 is a flow chart of a finite field lookup table method in accordance with one embodiment of the present invention.

FIG. 5 is a flow chart of a finite field lookup table method 500, in accordance with one embodiment of the present invention.

In step 510, create a finite field lookup table. In one embodiment, the finite field lookup table is a partial product lookup table (e.g., partial product lookup table 192). The finite field lookup table is a feedback lookup table (e.g., feedback lookup table 191. In one exemplary implementation the finite field lookup table maps finite field lookup table values with indexes associated with multiplier coefficients.

In step 520, identify a multiplier coefficient as an index to the finite field lookup table. In one embodiment of the present invention, a Galois field multiplication expression is parsed and coefficient values are extracted. For example, partial product coefficient values (e.g., $b_{n-k}$, $b_{n-k-1}$) are extracted. Feedback coefficient values (e.g. C(k−1)[n−1] and C(k)[n−1]) are extracted.

In step 530, the identified multiplier coefficient is utilized to return a value from the finite field lookup table.

Thus, the present invention is a system and method that facilitates expedited Galois field multiplication results. A present invention Galois field multiplication system and method provides results faster than a traditional serial bit implementation without requiring the significant hardware resources (e.g., in terms of silicon area) of traditional parallel multipliers. The lookup tables permit the use of multiple bits of a multiplier to generate one partial product term and one feedback term in one clock cycle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A Galois field multiplier system comprising:
    a plurality of shift registers for performing shift multiplication operations;
    a plurality of exclusive OR components coupled to said plurality of shift registers, said plurality of exclusive OR components for performing addition operations;
    a partial product lookup table selectively coupled to said exclusive OR components, wherein values from said partial product lookup table are fed into said exclusive OR components; and
    a feedback lookup table selectively coupled to said exclusive OR components, wherein values from said feedback lookup table are fed into said exclusive OR components;
    wherein the Galois field multiplier system produces a final result of a Galois field multiplication operation to be used in error detection in data communication, error correction in data communication, data encryption, data decryption, data encoding, or data decoding, or combinations thereof.

2. The Galois field multiplier system of claim 1 wherein coefficients of a partial product term are utilized as indexes to said partial product lookup table.

3. The Galois field multiplier system of claim 1 wherein the Galois field multiplier system is further operable to reduce clock cycles required for producing the final result of the Galois field multiplication operation using a serial bit implementation.

4. The Galois field multiplier system of claim 1 wherein coefficients of a feedback term are utilized as indexes to said feedback lookup table.

5. The Galois field multiplier system of claim 1 wherein the Galois field multiplier system generates one partial product term and one feedback term in one clock cycle.

6. The Galois field multiplier system of claim 1 wherein the final result is a syndrome or a codeword.

7. The Galois field multiplier system of claim 1 wherein a value field of said partial product lookup table is the sum of partial products from non-zero index bits.

8. The Galois field multiplier system of claim 1 wherein a value field of said feedback lookup table is the sum of feedback terms from non-zero index bits.

9. The Galois field multiplier system of claim 1 wherein an index address of said feedback table is calculated by a look ahead method.

10. A Galois field multiplier method comprising:
utilizing a partial product lookup table to provide resulting partial product coefficient values of a polynomial;
utilizing a feedback lookup table to provide resulting feedback coefficient values of the polynomial;
performing an exclusive OR operation on said resulting partial product coefficient values and said resulting feedback coefficient values;
shifting results of said exclusive OR operation; and
producing a final result of a Galois field multiplication operation to be used in error detection in data communication, error correction in data communication, data encryption, data decryption, data encoding, or data decoding, or combinations thereof.

11. The Galois field multiplier method of claim 10 wherein utilizing the partial product lookup table further comprises utilizing multiple bits of the polynomial term.

12. The Galois field multiplier method of claim 11 further comprising utilizing the multiple bits as an index to said partial product lookup table to generate one partial product term in one clock cycle.

13. The Galois field multiplier method of claim 11 wherein the multiple bits of the polynomial term belong to a partial product term.

14. The Galois field multiplier method of claim 10 wherein utilizing the feedback lookup table further comprises utilizing multiple bits of the polynomial term.

15. The Galois field multiplier method of claim 14 further comprising utilizing the multiple bits as an index to said feedback lookup table to generate one feedback term in one clock cycle.

16. The Galois field multiplier method of claim 14 wherein the multiple bits of the polynomial term belong to a feedback term.

17. A Galois field multiplier apparatus comprising:
means for multiplying terms;
means for adding terms;
means for supplying one partial product value from multiple bits of a partial product multiplier wherein said means for supplying one partial product value includes means for looking up said partial product value;
means for supplying one feedback value from multiple bits of a feedback multiplier wherein said means for supplying one feedback value includes means for looking up said feedback value; and
means for producing a final result of a Galois field multiplication operation to be used in error detection in data communication, error correction in data communication, data encryption, data decryption, data encoding or data decoding, or combinations thereof.

18. The Galois field multiplier apparatus of claim 17 further comprising means for reducing clock cycles to produce the final result wherein said means for reducing clock cycles includes means for reducing exclusive OR iterations.

19. A computer usable medium having a computer readable program code embodied therein that when executed causes a computer to:
create a partial product lookup table;
create a feedback lookup table;
identify a partial product multiplier coefficient as an index to said partial product lookup table;
identify a feedback multiplier coefficient as an index to said feedback lookup table;
utilize the identified partial product multiplier coefficient to return a partial product value from said partial product lookup table;
utilize the identified feedback multiplier coefficient to return a feedback value from said feedback lookup table; and
produce a final result that is associated with Galois field multiplication and to be used in; error detection in data communication, error correction in data communication, data encryption, data decryption, data encoding or data decoding, or combinations thereof.

20. The computer usable medium of claim 19 having the computer readable program code embodied therein that when executed further causes the computer to perform an exclusive OR operation on said partial product values and said feedback values.

21. The computer usable medium of claim 20 having the computer readable program code embodied therein that when executed further causes the computer to shift results of said exclusive OR operation.

22. The computer usable medium of claim 19 having the computer readable program code embodied therein that when executed further causes the computer to reduce a number of exclusive OR iterations required in a Galois field multiplication operation by utilizing multiple feedback multiplier coefficients as indexes to said feedback lookup table and utilizing multiple partial product multiplier coefficients as indexes to said partial product lookup table in a serial bit implementation.

23. The computer usable medium of claim 19 having the computer readable program cod embodied therein that when executed further causes the computer to:
parse a Galois field multiplication expression; and
extract partial product coefficient values and feedback coefficient values.

* * * * *

UNITED STATES PATENT AND TRADEMARK OFFICE
CERTIFICATE OF CORRECTION

PATENT NO. : 7,526,518 B2  Page 1 of 1
APPLICATION NO. : 10/964850
DATED : April 28, 2009
INVENTOR(S) : Zhang et al.

It is certified that error appears in the above-identified patent and that said Letters Patent is hereby corrected as shown below:

At column 10, line 47, claim 23 please replace "program cod" with --program code--.

Signed and Sealed this

Thirtieth Day of June, 2009

JOHN DOLL
*Acting Director of the United States Patent and Trademark Office*